(No Model.) 2 Sheets—Sheet 1.

J. W. C. GILMAN.
COPY BOOK.

No. 321,594. Patented July 7, 1885.

WITNESSES. INVENTOR

UNITED STATES PATENT OFFICE.

JONA. W. C. GILMAN, OF READING, MASSACHUSETTS.

COPY-BOOK.

SPECIFICATION forming part of Letters Patent No. 321,594, dated July 7, 1885.

Application filed March 31, 1884. (No model.)

*To all whom it may concern:*

Be it known that I, J. W. C. GILMAN, of Reading, in the county of Middlesex and State of Massachusetts, a citizen of the United States, have invented a new and useful Improvement in Copy-Books, of which the following is a full, clear, and exact description, reference being had to the accompanying drawings, forming a part of this specification, in explaining its nature, in which—

Figure 1:
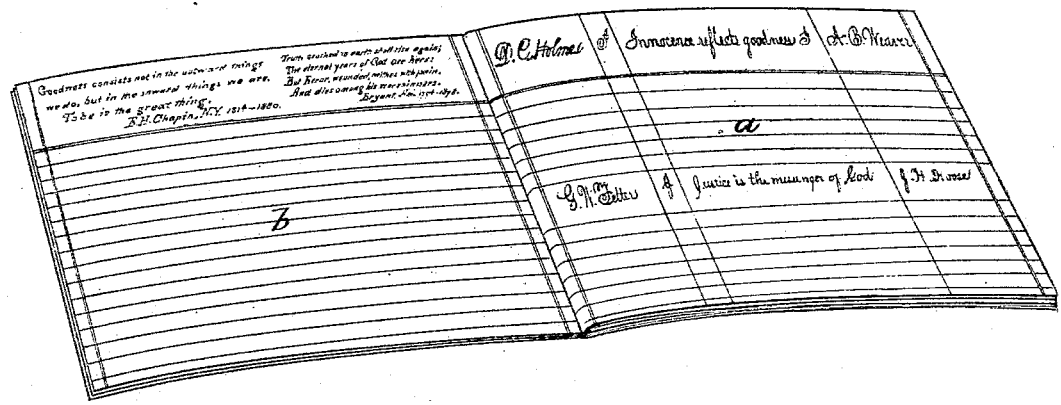
Figure 2:
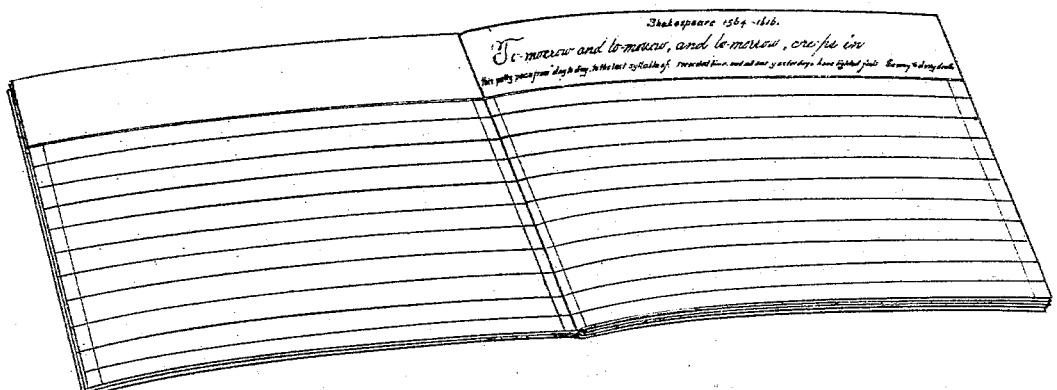
Figure 3:
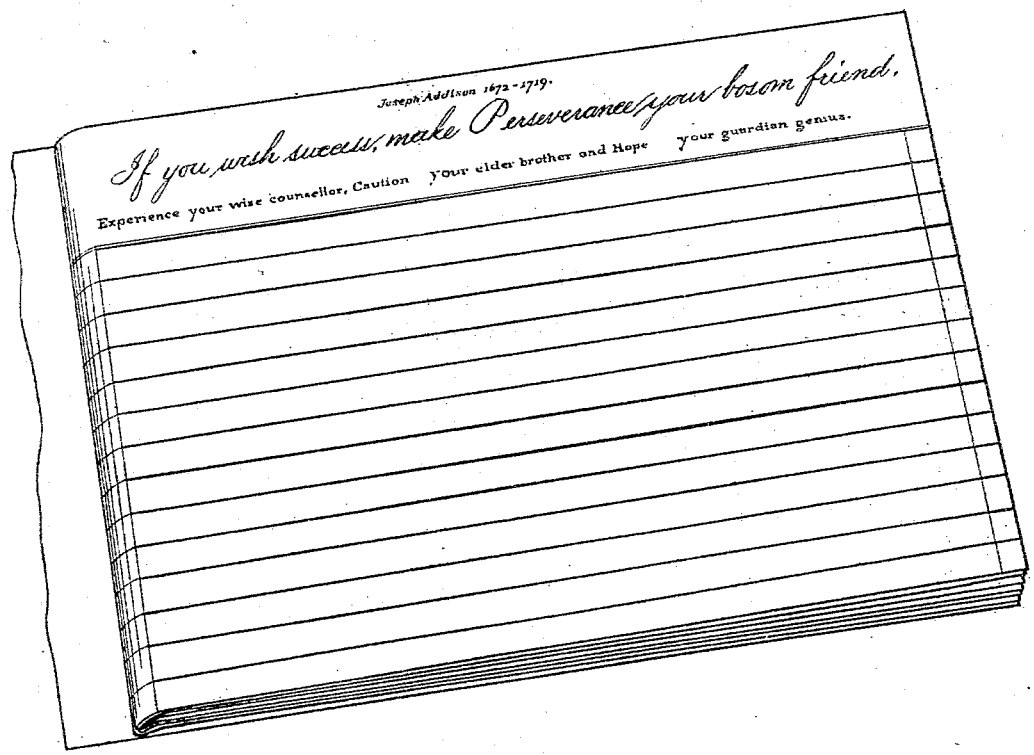

Figure 1 represents an open copy-book containing the features of my invention. Figs. 2 and 3 represent various applications thereof, which are hereinafter more fully specified.

It is well known that by the system of teaching penmanship now in vogue pupils are required to follow or transcribe a set copy, which is constantly before them, so closely that their writing becomes a more or less servile imitation of the copy, and that they do not get the variety or kind of practice which is adapted to naturally develop good practical penmanship, and while, after instruction of considerable duration, their progress may appear very creditable, as indicated by their exercises in the copy-book, yet upon entering into any occupation that demands more or less writing the writing generally shows a marked deterioration from that of the copy-book, and this, I think, is largely owing to the fact that the system of instruction always demands that the copy be before the writer, so that the pupil writes from the copy mechanically rather than from his mind, making it an inflexible, purely imitative copying exercise, affording no opportunity for changing the combination of letters or for the practical application of the exercise, and not a real penmanship exercise in a practical, useful, and broad way.

Good penmanship involves a knowledge of a large number of details which simple copying cannot impart. There are, first, the elementary principles, or those relating to the different lines and shapes used in forming letters and their combination into letters and words. Then there are the proper spacing of words, capitalization, punctuation, and spelling, and even composition; and until a pupil has acquired such a mastery of these details that a copy is of no value the writing is more or less crude and unsatisfactory, and it is true that so long as the penmanship exercise is simply copying from a set copy these essential details, if acquired at all, cannot be used in a way to be of any practical service.

I design to overcome this objection to the ordinary method of teaching penmanship by means of a copy-book which not only employs the set copies above referred to so long as they can be of value, whereby the pupil is made familiar with the various elementary details and rules which it is necessary for him to know, but also employs the printed copies, printed preferably on the upper margin of the page, and which may be written upon the page immediately below or may be first memorized and then written.

The drawings represent an exercise-book which contains the features of my invention. *a* represents a page having what is known as a "set copy" with ruled lines, and is in all respects like a page of an ordinary copy-book. *b* represents the opposite page, which has printed, in any form of letter excepting script, on the upper margin, one or more selections, quotations, or original matter of literary value, and the remainder of the page is for use of the scholar in writing out the printed selection, quotation, or other matter.

In the books intended for younger scholars the printed selection, quotation, or other matter may be printed on the page in such a way as to leave a space above or below or on either side of each printed word, in which the word can be written out. While the copy or exercise book may have the script copy upon one page and the copy in type other than script upon another, as shown in Figs. 1 and 2, I prefer the arrangement shown in Fig. 3, where the selection, quotation, or other matter is written to serve as a copy and the remainder is printed, so that the copy-line may be used as a model copy and for all the purposes of a set copy, and the printed remainder of the selection or matter used, as herein described, to practically apply the instruction previously obtained and also furnished by the model copy.

Having thus fully described my invention, I claim and desire to secure by Letters Patent of the United States—

A copy-book having printed upon its pages a composite exercise in script and type other than script for reproduction, in script only, upon a portion of the page below, whereby the character or style of the penmanship to be followed is indicated by the script portion of the exercise, and it serves as a copy in determining the style and character of the entire copy to be reproduced, and whereby the part of the exercise not in script must be reproduced in script without any other assistance than that provided by the set script copy, all substantially as and for the purposes described.

JONA. W. C. GILMAN.

Witnesses:
F. F. RAYMOND, 2d,
FRED. B. DOLAN.